United States Patent
Tsutsui et al.

(10) Patent No.: US 11,879,587 B2
(45) Date of Patent: Jan. 23, 2024

(54) POSITIONING APPARATUS

(71) Applicant: Panasonic Intellectual Property Management Co., Ltd., Osaka (JP)

(72) Inventors: Tomoya Tsutsui, Osaka (JP); Eiji Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/775,476

(22) PCT Filed: Sep. 1, 2020

(86) PCT No.: PCT/JP2020/032982
§ 371 (c)(1),
(2) Date: May 9, 2022

(87) PCT Pub. No.: WO2021/095327
PCT Pub. Date: May 20, 2021

(65) Prior Publication Data
US 2022/0397231 A1 Dec. 15, 2022

(30) Foreign Application Priority Data
Nov. 12, 2019 (JP) .................... 2019-204647

(51) Int. Cl.
*F16M 11/20* (2006.01)
*F16M 11/22* (2006.01)

(52) U.S. Cl.
CPC ........ *F16M 11/2021* (2013.01); *F16M 11/22* (2013.01)

(58) Field of Classification Search
CPC .................... F16M 11/2021; F16M 11/22

USPC ....... 248/127, 128, 133, 139, 140, 371, 398, 248/188.1, 188.2, 346.01, 346.05, 346.06
See application file for complete search history.

(56) References Cited

U.S. PATENT DOCUMENTS

| 4,749,867 A | * | 6/1988 | Matsushita | ......... G03F 7/70691 250/442.11 |
| 6,112,917 A | * | 9/2000 | Baker | .................... A47B 53/02 384/58 |
| 6,305,657 B1 | * | 10/2001 | Manpuku | ............... F16M 11/10 248/371 |

(Continued)

FOREIGN PATENT DOCUMENTS

JP 2015-111648 A 6/2015

OTHER PUBLICATIONS

International Search Report issued in corresponding International Application No. PCT/JP2020/032982, dated Nov. 2, 2020 w/Machine English Translation.

*Primary Examiner* — Alfred J Wujciak
(74) *Attorney, Agent, or Firm* — Rimon, P.C.

(57) ABSTRACT

A positioning apparatus includes: an upper unit that includes a spherical body, a retainer part that retains the spherical body, and an upper plate part provided on the retainer part and adapted to carry a carried object; a lower unit that includes a lower plate part on which the upper unit is mounted and a guide part that marks a region of movement of the upper unit on the lower plate part; and a tilting structure that tilts the region of movement relative to a horizontal plane and guides the upper unit, on which the carried object is not mounted, toward a reference position located on a lower side of a tilt.

7 Claims, 10 Drawing Sheets

(56) References Cited

U.S. PATENT DOCUMENTS

| | | | | |
|---|---|---|---|---|
| 7,516,934 B2* | 4/2009 | Chu | ................ | G01N 35/028 248/371 |
| 11,630,374 B2* | 4/2023 | Richins | ............ | G03B 15/02 362/418 |
| 2018/0023755 A1* | 1/2018 | Matthews | ........ | F16M 11/38 248/128 |

* cited by examiner

POSITIONING APPARATUS

CROSS-REFERENCE TO RELATED APPLICATIONS

This application is the U.S. National Phase under 35 U.S.C. § 371 of International Patent Application No. PCT/JP2020/032982, filed on Sep. 1, 2020, which in turn claims the benefit of Japanese Application No. 2019-204647, filed on Nov. 12, 2019, the entire disclosures of each of which Applications are incorporated by reference herein in their entirety.

BACKGROUND

Field of the Invention

The present disclosure relates to a positioning apparatus.

Description of the Related Art

Recently, industrial robots are used in production lines for various industrial products. A robot is structured such that end effector such as a hand is attached to the end of an arm and can grip a component or a work by means of the end effector. Generally, the operation of a robot is controlled according to position control. When the position of an object gripped is displaced from a pre-programmed target position, therefore, the robot might not be able to grip the object properly. It is therefore desired to finely adjust the position of an object so that the position of the object agrees with the target position. In this background, patent literature 1 discloses a work positioning apparatus capable of finely adjusting the horizontal position of a work.
Patent literature 1: JP2015-111648

The above-mentioned related-art positioning apparatus is structured such that a table part not carrying a work is returned to the centering position by a volute spring. Therefore, the number of components in the related-art positioning apparatus is large, and the structure thereof is complicated. A larger number of components could lead to a larger size of the positioning apparatus. The manufacturing cost of the positioning apparatus is also increased accordingly. Further, an attempt to reduce the size of the positioning apparatus requires reducing the size of components and could lead to reduced durability of the components and, ultimately, reduced durability of the positioning apparatus.

SUMMARY OF THE INVENTION

An embodiment of the present disclosure relates to a positioning apparatus. The positioning apparatus includes: an upper unit that includes a spherical body, a retainer part that retains the spherical body, and an upper plate part provided on the retainer part and adapted to carry a carried object; a lower unit that includes a lower plate part on which the upper unit is mounted and a guide part that marks a region of movement of the upper unit on the lower plate part; and a tilting structure that tilts the region of movement relative to a horizontal plane and guides the upper unit, on which the carried object is not mounted, toward a reference position located on a lower side of a tilt.

Optional combinations of the aforementioned constituting elements, and implementations of the present disclosure in the form of methods, devices, systems, etc. may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
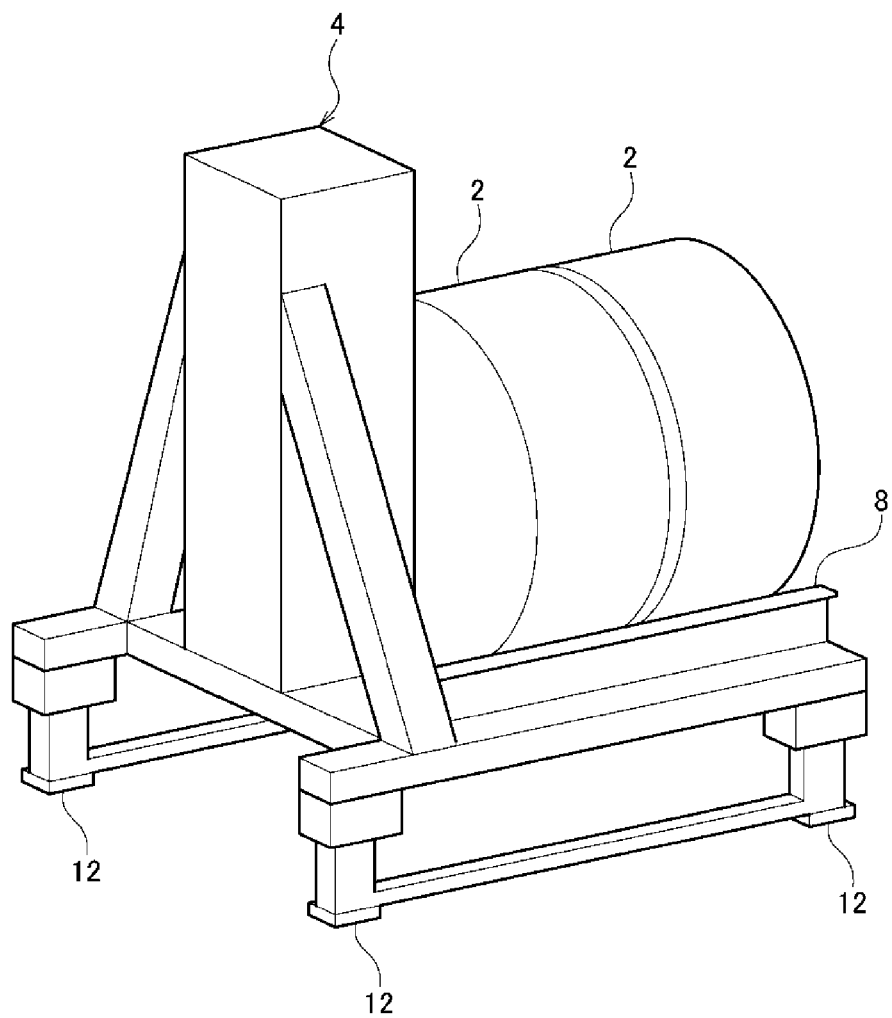
FIG. 1 is a perspective view of a carried object mounted on the positioning apparatus according to embodiment 1.

Hereinafter, the present disclosure will be described based on preferred embodiments with reference to the accompanying drawings. The embodiments are not intended to limit the scope of the present disclosure but exemplify the present disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

Embodiment 1

Figure 2:
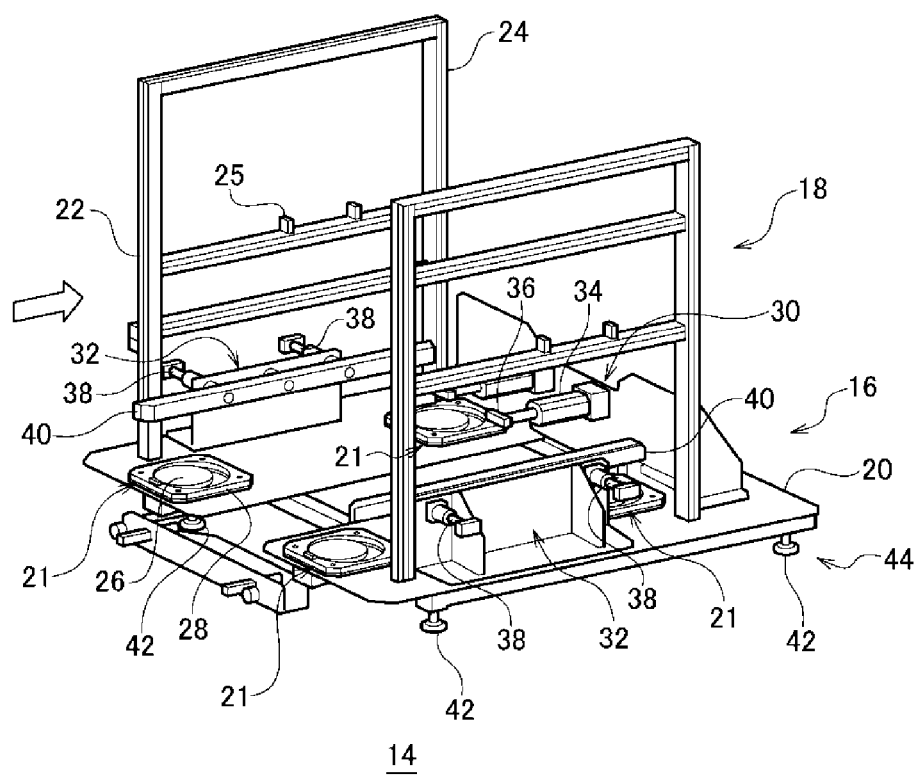
FIG. 2 is a perspective view of a rack restriction apparatus provided with a positioning apparatus.
Figure 3:
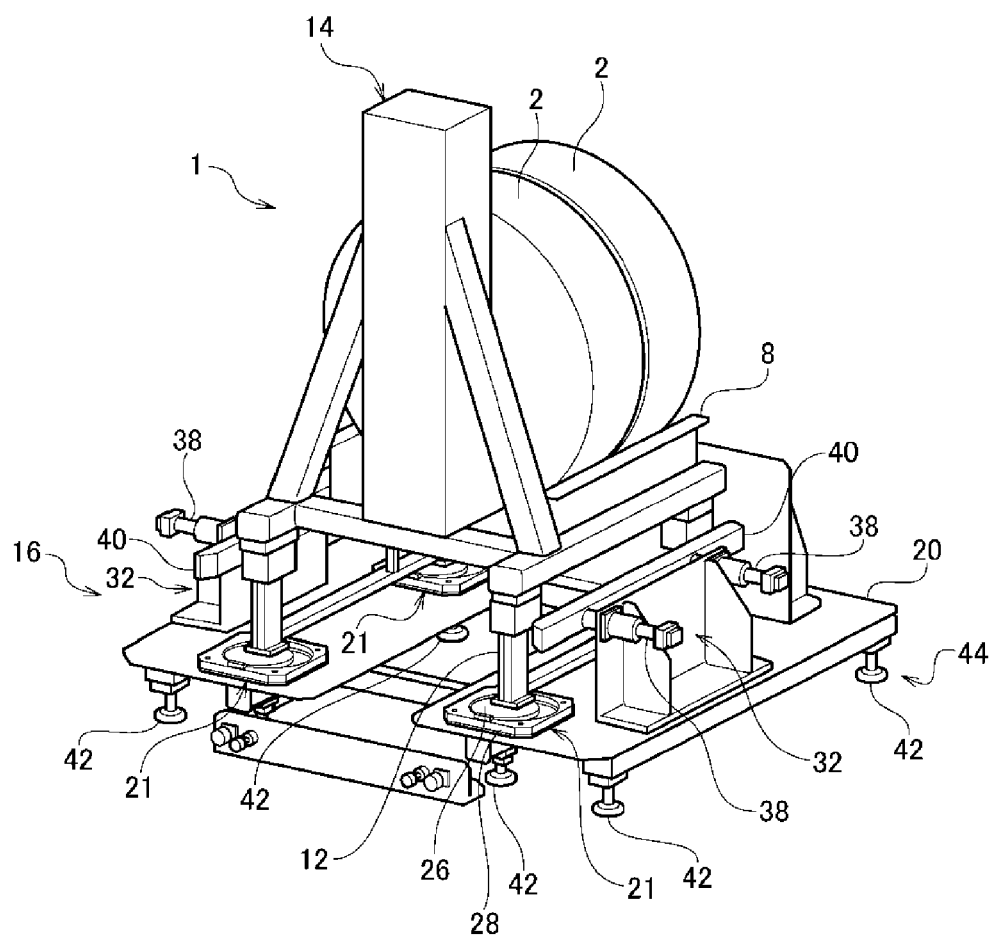
FIG. 3 is a perspective view showing how the carried object is mounted on the rack restriction apparatus.
Figure 4:
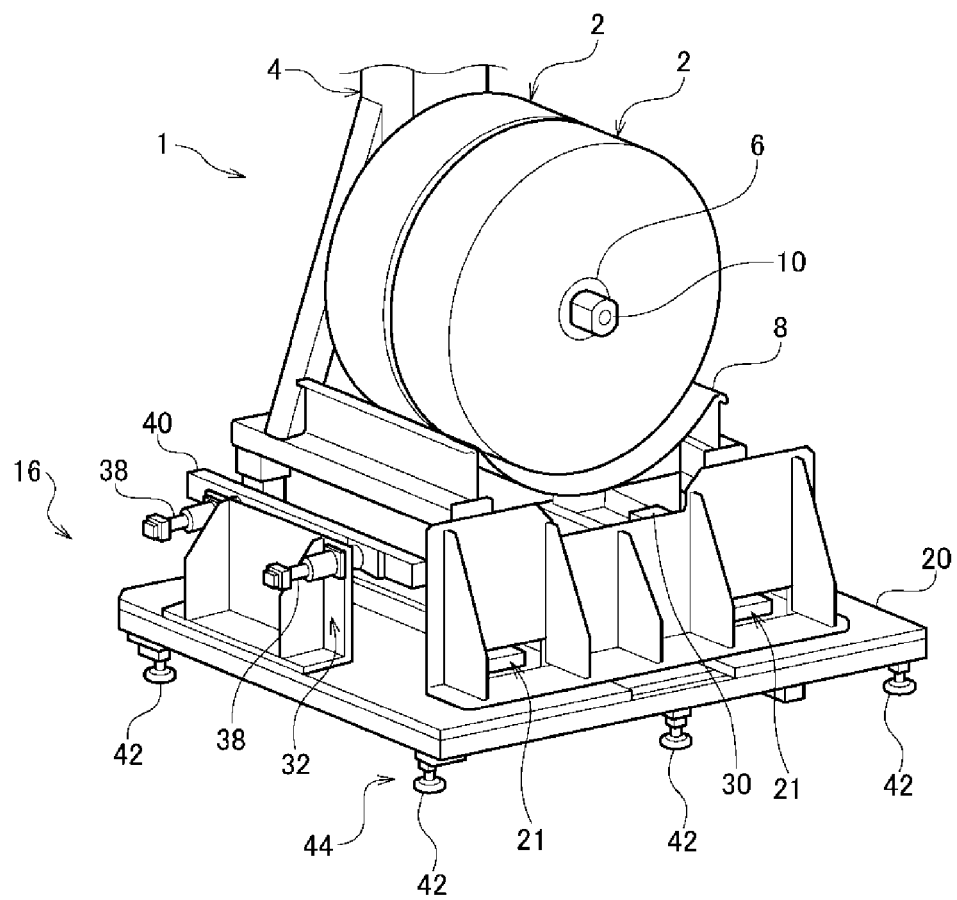
FIG. 4 is a perspective view showing how the carried object is mounted on the rack restriction apparatus.

FIG. 1 is a perspective view of a carried object mounted on the positioning apparatus according to embodiment 1. FIG. 2 is a perspective view of a rack restriction apparatus provided with a positioning apparatus. FIGS. 3 and 4 are perspective views showing how the carried object is mounted on the rack restriction apparatus. In FIGS. 3 and 4, illustration of a housing frame body 18 is omitted. The positioning apparatus 16 according to this embodiment is used to finely adjust the position of a carried object 1 mounted on a rack restriction apparatus 14.

The carried object 1 includes, by way of one example, an electrode hoop 2 and an electrode rack 4 for supporting the electrode hoop 2. The electrode hoop 2 is produced by winding an electrode plate of a secondary battery around a bobbin, and has a through hole 6 in the center. The electrode rack 4 includes a rack body 8, a support shaft 10 projecting from the rack body 8 substantially in the horizontal direction, and a rack leg 12 projecting downward from the rack body 8. The electrode rack 4 according to this embodiment includes four rack legs 12. The electrode hoop 2 is supported by the electrode rack 4 such that the support shaft 10 is inserted in the through hole 6. In this embodiment, two electrode hoops 2 are supported by one electrode rack 4. The weight of the carried object 1 is, for example, 500 kg to 1000 kg. The carried object 1 is not limited to the electrode hoop 2 and the electrode rack 4.

The rack restriction apparatus 14 includes the positioning apparatus 16 and the housing frame body 18. The positioning apparatus 16 includes a base plate 20 and a movable part 21. The carried object 1 is mounted on the base plate 20. The housing frame body 18 is fixed to the upper surface of the base plate 20. The housing frame body 18 surrounds the carried object 1 while the carried object 1 is placed on the base plate 20.

The housing frame body 18 includes an entrance frame 22 and an exit frame 24 opposite to each other. The carried object 1 is inserted from the entrance frame 22 and mounted on the base plate 20. The end of the support shaft 10 faces the exit frame 24 while the carried object 1 is placed on the base plate 20. An arm (not shown) of a robot advances from the exit frame 24 to a position above the base plate 20, grips the electrode hoop 2 of the carried object 1, and dismantles the electrode hoop 2 from the support shaft 10. The housing frame body 18 includes a sensor 25 for sensing that the carried object 1 is mounted on the base plate 20.

The movable part 21 is a floating unit that supports the carried object 1 and is fixed to the upper surface of the base plate 20. The movable part 21 includes an upper unit 26 and a lower unit 28. The positioning apparatus 16 of this embodiment includes four movable parts 21 to correspond to the four rack legs 12. The lower unit 28 of each movable part 21 is supported by the base plate 20. The upper unit 26 is mounted on the lower unit 28. The rack leg 12 of the electrode rack 4 is mounted on each upper unit 26. Displacement of each upper unit 26 relative to each lower unit 28 finely adjusts the position of the carried object 1.

The positioning apparatus 16 includes a drawing mechanism 30 and a pair of lateral position adjustment mechanisms 32. The drawing mechanism 30 is provided on the side of the base plate 20 opposite to the entrance frame 22, i.e., toward the exit frame 24. The drawing mechanism 30 includes, by way of one example, an air cylinder 34 and a catching pawl 36 attached to the end of the piston provided in the air cylinder 34. The air cylinder 34 can extend or contract in the direction of advancement of the carried object 1, i.e., in the direction in which the entrance frame 22 and the exit frame 24 are aligned. The drawing mechanism 30 can finely adjust the position of the carried object 1 in the direction of advancement of the carried object 1 by catching the catching pawl 36 in the rack body 8 of the carried object 1 mounted on the upper unit 26 to extend or contract the air cylinder 34.

The pair of lateral position adjustment mechanisms 32 are aligned in a direction (hereinafter, referred to as lateral direction for convenience) orthogonal to the direction of advancement of the carried object 1. Each lateral position adjustment mechanism 32 includes, by way of one example, a pair of air cylinders 38 and an extrusion rod 40 attached to the end of the piston provided in each air cylinder 38. The air cylinder 38 can extend or contract in the lateral direction. The pair of lateral position adjustment mechanisms 32 can finely adjust the position of the carried object 1 in the lateral direction by thrusting the respective extrusion rods 40 against the rack body 8 of the carried object 1 mounted on the upper unit 26 so as to extend or contract each air cylinder 38. For example, the extrusion force of one of the lateral position mechanisms 32 is configured to be weaker than that of the other lateral position mechanism 32. This ensures that the lateral position of the carried object 1 is adjusted in a stable manner.

The base plate 20 includes a leg part 42 that projects from the lower surface. The rack restriction apparatus 14 is supported on the floor face by the leg part 42. In this embodiment, two leg parts 42 are provided at the edges of the base plate 20 toward the entrance frame 22 so as to be aligned in the lateral direction, and three leg parts 42 are provided at the edges toward the exit frame 24 so as to be aligned in the lateral direction. Each leg part 42 is formed by an adjuster bolt, etc. and can extend or contract independently. Therefore, leveling adjustment of the electrode rack 4 is possible by adjusting the length of each leg part 42.

The positioning apparatus 16 has a tilting structure 44. The tilting structure 44 of this embodiment is formed by the leg part 42. The tilting structure 44 is a mechanism to tilt the movable part 21 relative to the horizontal plane. The movable part 21 and the tilting structure 44 will be described in detail.

Figure 5:
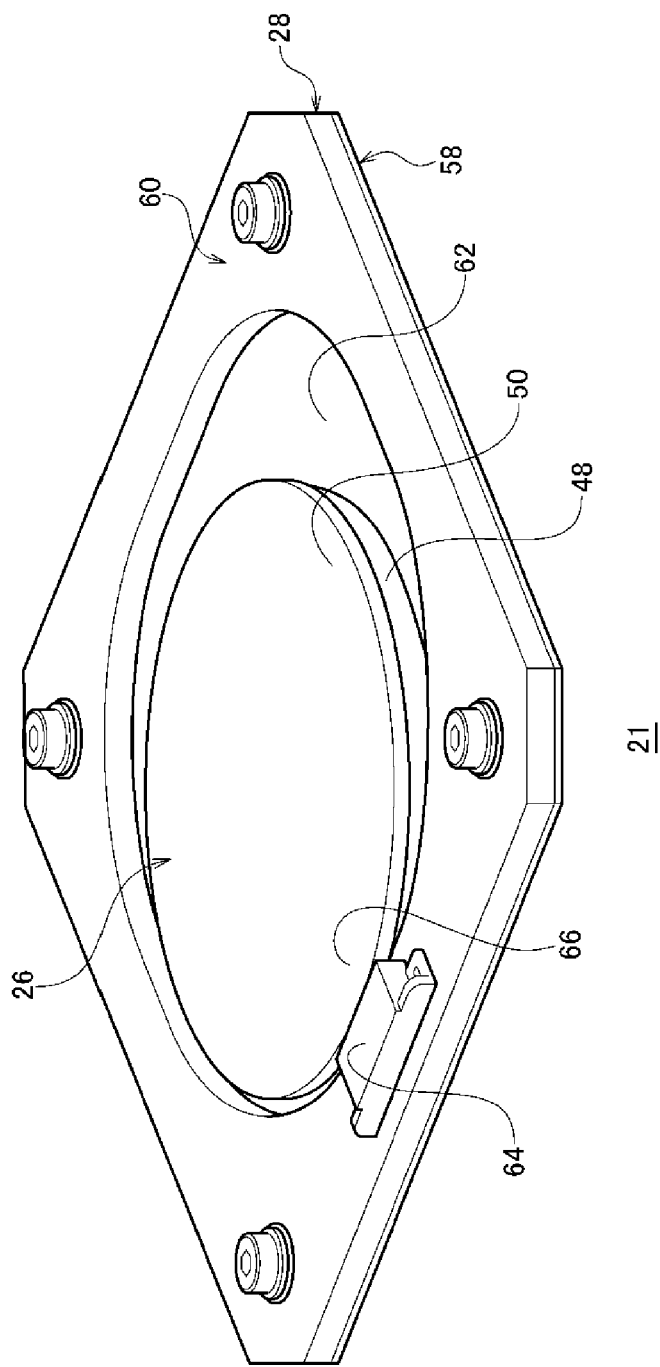
FIG. 5 is a perspective view of the movable part provided in the positioning apparatus.
Figure 6:
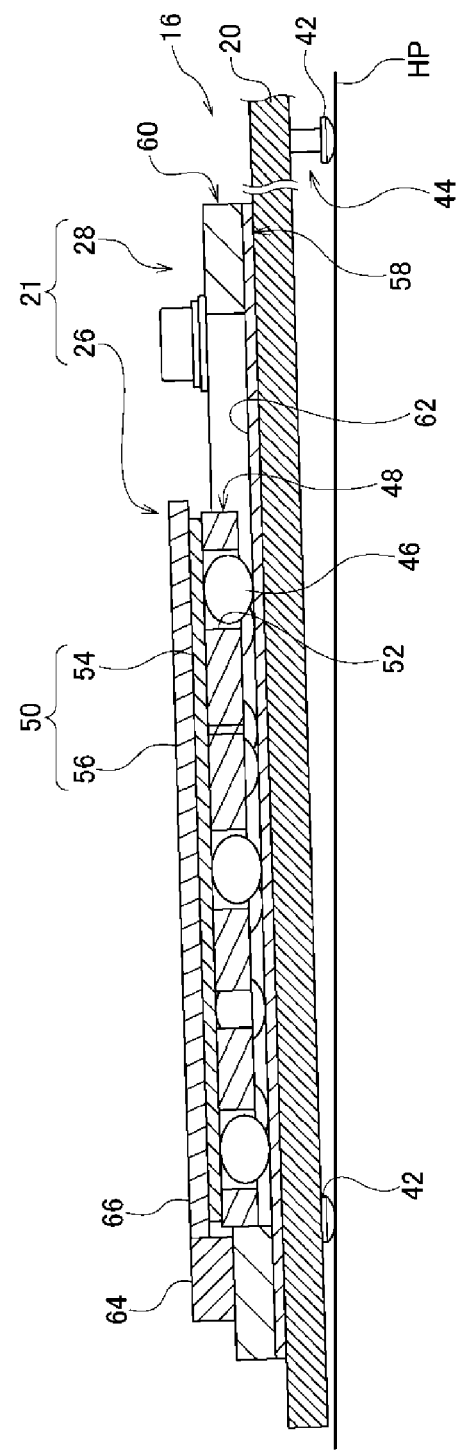
FIG. 6 is a cross-sectional view of the positioning apparatus.

FIG. 5 is a perspective view of the movable part 21 provided in the positioning apparatus 16. FIG. 6 is a cross-sectional view of the positioning apparatus 16. As described above, the movable part 21 includes the upper unit 26 and the lower unit 28. The upper unit 26 includes a spherical body 46, a retainer part 48, and an upper plate part 50.

The spherical body 46 is a high-rigidity ball formed by, for example, a steel ball. The upper unit 26 of this embodiment includes a plurality of spherical bodies 46. The plurality of spherical bodies 46 are arranged at predetermined intervals in a plan view. The retainer part 48 is a plate body extending in parallel to the base plate 20 and includes a plurality of through holes 52 connecting two opposite principal surfaces. The spherical body 46 is housed in each through hole 52. This ensures that the plurality of spherical bodies 46 are retained by the retainer part 48.

The upper plate part 50 is provided on the retainer part 48. For example, the upper plate part 50 is fixed to the upper surface of the retainer part 48. The carried object 1 is mounted on the upper surface of the upper plate part 50. The upper plate part 50 of this embodiment is structured such that a top plate 56 is mounted on a high-rigidity plate 54 formed by a hardened plate, etc. Further, the upper plate part 50 is circular in a plan view. The opening above each through hole 52 is blocked by the high-rigidity plate 54. Therefore, the spherical body 46 is in contact with the high-rigidity plate 54. The retainer part 48 and the upper plate part 50 may be formed by the same member and integrated with each other.

The lower unit 28 includes a lower plate part 58 and a guide part 60. The lower plate part 58 is formed by, for example, a high-rigidity plate such as a hardened plate and is fixed to the upper surface of the base plate 20. The upper unit 26 is mounted on the lower plate part 58. In this state, the spherical body 46 is in contact with the upper surface of the lower plate part 58. The upper unit 26 can move on the upper surface of the lower unit 28 as the spherical body 46 rolls on the upper surface of the lower plate part 58.

The central region on the upper surface of the lower plate part 58 forms a region of movement 62 of the upper unit 26.

The upper unit 26 can move within the region of movement 62. The guide part 60 has a frame shape and marks the region of movement 62 by being fixed to the upper surface of the lower plate part 58. The guide part 60 extends on the peripheral part of the upper surface of the lower plate part 58 and surrounds the outer circumference of the region of movement 62. The region of movement 62 of this embodiment is circular in a plan view. The upper unit 26 is restricted from moving outside the region of movement 62 by butting against the guide part 60. The lower plate part 58 and the guide part 60 may be formed by the same member and integrated with each other.

The tilting structure 44 tilts the region of movement 62 relative to the horizontal plane HP and guides the upper unit 26 on which the carried object 1 is not mounted toward the reference position located on the lower side of the tilt. FIG. 6 shows that the upper unit 26 is located at the reference position. The horizontal plane HP is the plane of installation of the positioning apparatus 16 or the rack restriction apparatus 14 or the floor face. Providing a tilt in the region of movement 62 allows the upper unit 26, on which the carried object 1 is not mounted and to which a load is not exerted from outside, to move toward the lower side of the tilt under its own weight. The upper unit 26 moves downs the tilt of the region of movement 62 and comes to a stop at a position where it butts against the guide part 60. The position represents the reference position. The tilting angle of the region of movement 62 relative to the horizontal plane HP is, for example, 0.5 degrees.

As described above, the tilting structure 44 is formed by the leg part 42. By configuring some leg parts 42 of the tilting structure 44 to be longer than the other leg parts 42, the base plate 20 is tilted relative to the horizontal plane HP. Since the lower plate part 58 is fixed to the upper surface of the base plate 20, the entirety of the lower plate part 58, including the region of movement 62, can be tilted by tilting the base plate 20. The tilting structure 44 of this embodiment tilts the base plate 20 by extending the leg part 42 provided toward the exit frame 24 farther than the leg part 42 provided toward the entrance frame 22. Therefore, the upper unit 26 is nearer the entrance frame 22 as shown in FIG. 2. In the positioning apparatus 16 of this embodiment, therefore, the reference position is eccentrically located toward the upstream side in the direction of advancement of the carried object 1.

Tilting the base plate 20 such that the exit frame 24 is higher and the entrance frame 22 is lower ensures that the end of the support shaft 10 is higher than the base thereof. This restricts the electrode hoop 2 from being dislodged from the support shaft 10 while the carried object 1 is mounted on the rack restriction apparatus 14.

The positioning apparatus 16 includes a first attraction member 64 and a second attraction member 66 that attract each other by a magnetic force. At least one of the first attraction member 64 and the second attraction member 66 is a magnet (permanent magnet) or an electromagnet, and the other is a magnet, an electromagnet, or a ferromagnetic body. Materials forming the first attraction member 64 and the second attraction member 66 are exemplified by a hard magnetic body such as a neodymium-iron-boron magnet, a ferrite magnet, and an alnico magnet, and a soft magnetic body such as a magnetic steel sheet, a magnetic stainless steel, sendust, and a soft magnetic composite (SMC).

The first attraction member 64 is provided in a region in the lower unit 28 on the lower side of the tilt. In other words, the first attraction member 64 is provided near the reference position. In this embodiment, the first attraction member 64 is fixed to the guide part 60. The second attraction member 66 is provided in a region in the upper unit 26 on the lower side of the tilt. In this embodiment, the second attraction member 66 is provided in the upper unit 26 such that the top plate 56 is formed by the second attraction member 66. The entirety of the top plate 56 may be formed by the second attraction member 66, or only a region in the top plate 56 on the lower side of the tilt may be formed by the second attraction member 66. Alternatively, the second attraction member 66 may be provided in the retainer part 48 or the high-rigidity plate 54.

The region in the lower unit 28 on the lower side of the tilt is a region that includes a part closest to the entrance frame 22 in the region of movement 62 (circular in a plan view). Further, the region in the upper unit 26 on the lower side of the tilt is a region that includes a part closest to the entrance frame 22 in the second attraction member 66 (circular in a plan view). The first attraction member 64 and the second attraction member 66 are provided such that they are opposite to other while the upper unit 26 is at the reference position. This allows the upper unit 26 to remain at the reference position in a stable manner.

As described above, the positioning apparatus 16 according to this embodiment includes the upper unit 26, the lower unit 28, and the tilting structure 44. The upper unit 26 includes the spherical body 46, the retainer part 48 that retains the spherical body 46, and the upper plate part 50 provided on the retainer part 48 and adapted to carry the carried object 1. The lower unit 28 includes the lower plate part 58 on which the upper unit 26 is mounted and the guide part 60 that marks the region of movement 62 of the upper unit 26 on the upper surface of the lower plate part 58. The tilting structure 44 tilts the region of movement 62 relative to the horizontal plane HP and guides the upper unit 26 on which the carried object 1 is not provided toward the reference position located on the lower side of the tilt.

According to the positioning apparatus 16 of this embodiment, the upper unit 26 on which the carried object 1 is not mounted can be returned to the reference position automatically by utilizing the gravitational force exerted on the upper unit 26. This helps reduce the number of components constituting the positioning apparatus 16 and simplify the structure. Further, the size and the manufacturing cost of the positioning apparatus 16 can be reduced. Further, the durability of the positioning apparatus 16 can be increased. The upper unit 26 always remains at the reference position when the carried object 1 is mounted on the rack restriction apparatus 14. Therefore, variation in the range of positions of the carried object 1 that can be adjusted by the positioning apparatus 16 is avoided.

Further, the positioning apparatus 16 includes the base plate 20 that supports the lower unit 28. The base plate 20 includes the leg part 42 that projects from the lower surface, and the tilting structure 44 is formed by the leg part 42. This makes it possible to provide a tilt in the region of movement 62 with a simple structure.

Further, the positioning apparatus 16 includes the first attraction member 64 and the second attraction member 66 that attract each other by a magnetic force. The first attraction member 64 is provided in the region in the lower unit 28 on the lower side of the tilt, and the second attraction member 66 is provided in the region in the upper unit 26 on the lower side of the tilt. This can maintain a state in which the upper unit 26 remains at the reference position in a stable manner.

Embodiment 2

Figure 7:
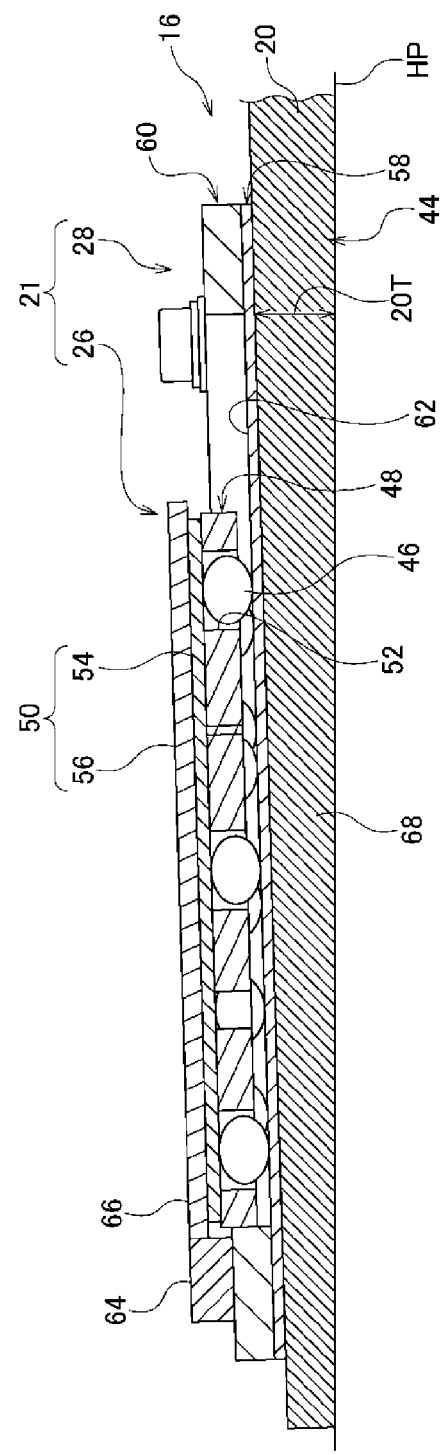
FIG. 7 is a cross-sectional view of the positioning apparatus according to embodiment 2.

Embodiment 2 shares common features with embodiment 1 except for the tilting structure 44. The following description of this embodiment highlights features different from those of embodiment 1, and the description of the common features will be simplified or omitted. FIG. 7 is a cross-sectional view of the positioning apparatus 16 according to embodiment 2.

The positioning apparatus 16 includes the upper unit 26 that includes the spherical body 46, the retainer part 48 and the upper plate part 50, the lower unit 28 that includes the lower plate part 58 and the guide part 60, and the tilting structure 44 that tilts the region of movement 62 relative to the horizontal plane HP to guide the upper unit 26 toward the reference position. Further, the positioning apparatus 16 includes the base plate 20 that supports the lower unit 28.

The base plate 20 of this embodiment includes a graded change part 68 in which the thickness 20T of the part that overlaps the region of movement 62 in the vertical direction is progressively smaller from one end of the region of movement 62 toward the other. In this embodiment, the thickness 20T is progressively smaller from the side of the exit frame 24 toward the entrance frame 22 over the entirety of the base plate 20. Therefore, the graded change part 68 is provided over the entirety of the base plate 20. Provision of the graded change part 68 tilts the upper surface of the base plate 20 relative to the horizontal plane HP. The lower plate part 58 is fixed to the upper surface of the base plate 20 so that the graded change part 68 also tilts the region of movement 62. Therefore, the tilting structure 44 of this embodiment is formed by the graded change part 68. The feature provides the same advantage as that of embodiment 1.

Embodiment 3

Figure 8:
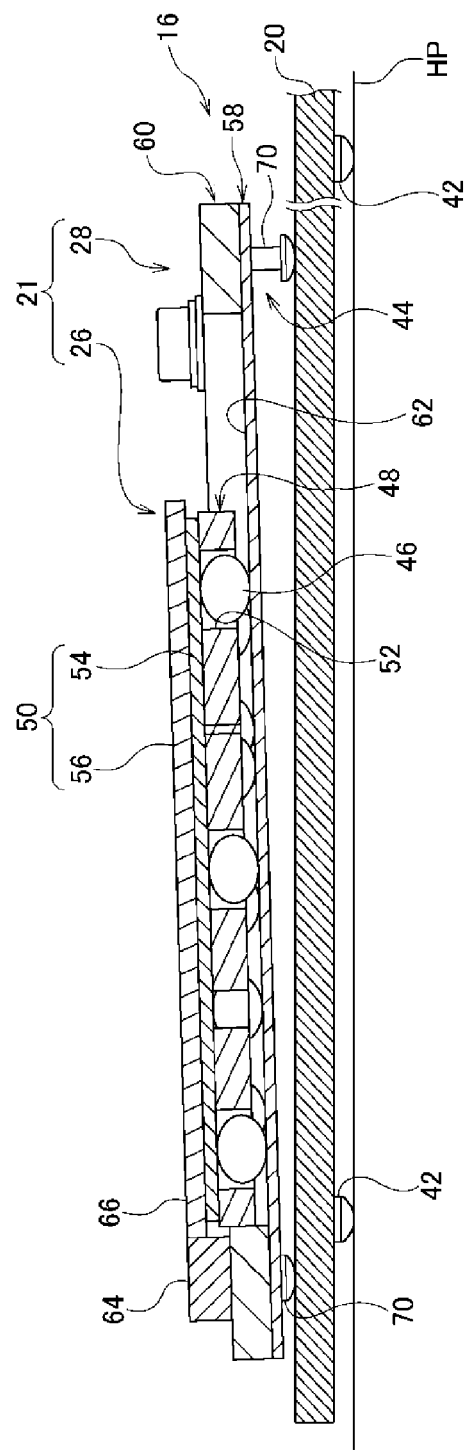
FIG. 8 is a cross-sectional view of the positioning apparatus according to embodiment 3.

Embodiment 3 shares common features with embodiment 1 except for the tilting structure 44. The following description of this embodiment highlights features different from those of embodiment 1, and the description of the common features will be simplified or omitted. FIG. 8 is a cross-sectional view of the positioning apparatus 16 according to embodiment 3.

The positioning apparatus 16 includes the upper unit 26 that includes the spherical body 46, the retainer part 48 and the upper plate part 50, the lower unit 28 that includes the lower plate part 58 and the guide part 60, and the tilting structure 44 that tilts the region of movement 62 relative to the horizontal plane HP to guide the upper unit 26 toward the reference position.

The lower unit 28 of this embodiment includes a leg part 70 that projects downward. By way of one example, the leg part 70 projects downward from the lower surface of the lower plate part 58. Further, a plurality of leg parts 70 are provided at each of the edge of the lower plate part 58 toward the entrance frame 22 and the edge toward the exit frame 24. Like the leg part 42, each leg part 70 is formed by an adjuster bolt, etc. and can extend or contract independently. The tilting structure 44 of this embodiment is formed by the leg part 70. By configuring some leg parts 70 of the tilting structure 44 to be longer than the other leg parts 70, the region of movement 62 is tilted relative to the horizontal plane HP. The feature provides the same advantage as that of embodiment 1.

Embodiment 4

Figure 9:
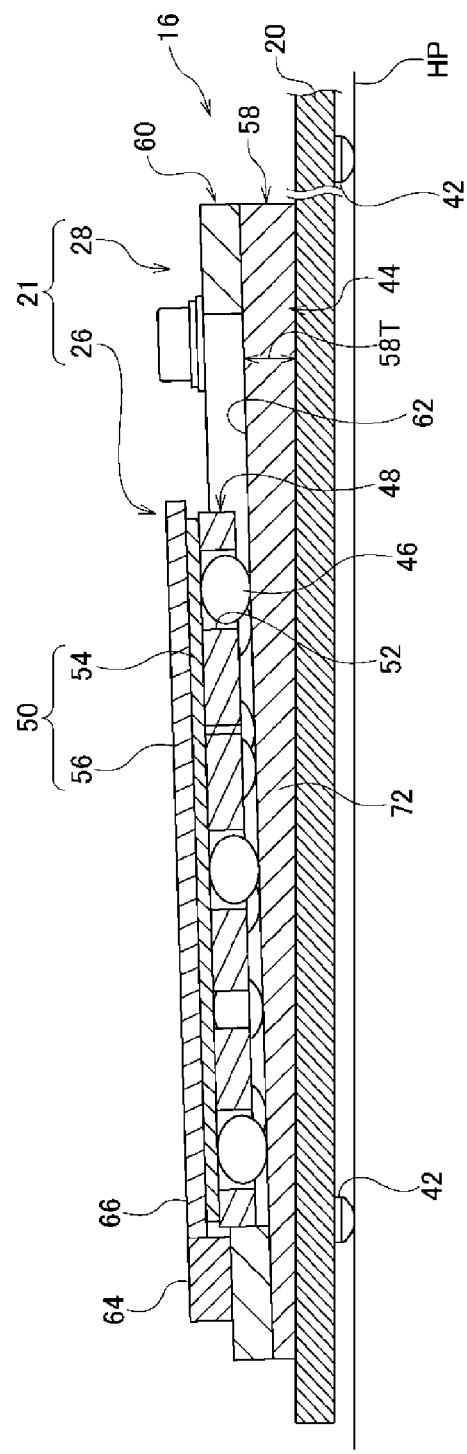
FIG. 9 is a cross-sectional view of the positioning apparatus according to embodiment 4.

Embodiment 4 shares common features with embodiment 1 except for the tilting structure 44. The following description of this embodiment highlights features different from those of embodiment 1, and the description of the common features will be simplified or omitted. FIG. 9 is a cross-sectional view of the positioning apparatus 16 according to embodiment 4.

The positioning apparatus 16 includes the upper unit 26 that includes the spherical body 46, the retainer part 48 and the upper plate part 50, the lower unit 28 that includes the lower plate part 58 and the guide part 60, and the tilting structure 44 that tilts the region of movement 62 relative to the horizontal plane HP to guide the upper unit 26 toward the reference position.

The lower plate part 58 of this embodiment includes a graded change part 72 in which the thickness 58T of the part that includes the region of movement 62 is progressively smaller from one end of the region of movement 62 toward the other. In this embodiment, the thickness 58T is progressively smaller from the side of the exit frame 24 toward the side of the entrance frame 22 over the entirety of the lower plate part 58. Therefore, the graded change part 72 is provided over the entirety of the lower plate part 58. Provision of the graded change part 72 tilts the region of movement 62 relative to the horizontal plane HP. Therefore, the tilting structure 44 of this embodiment is formed by the graded change part 72. The feature provides the same advantage as that of embodiment 1.

Embodiment 5

Figure 10A:
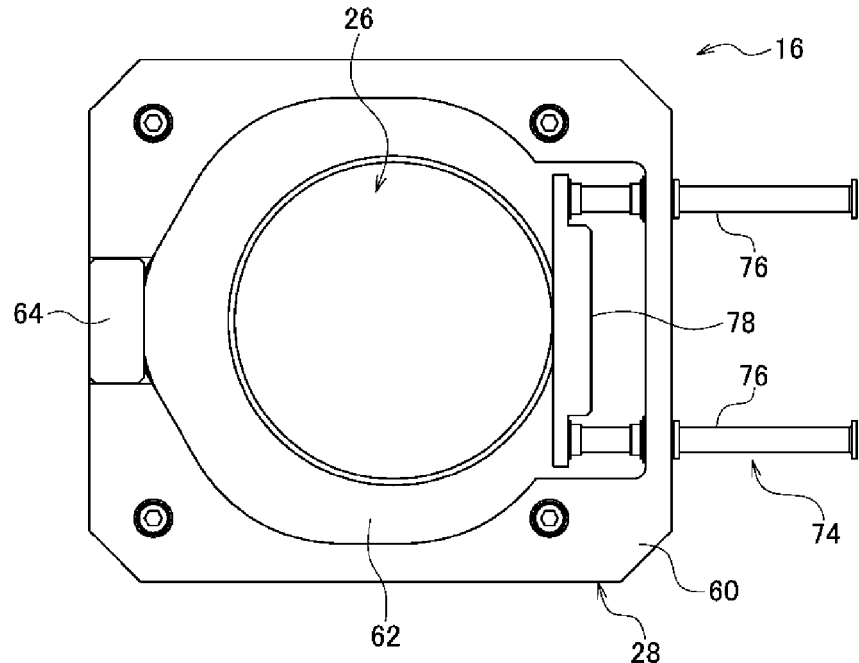
FIG. 10A is a plan view of the positioning apparatus according to embodiment 5.
Figure 10B:
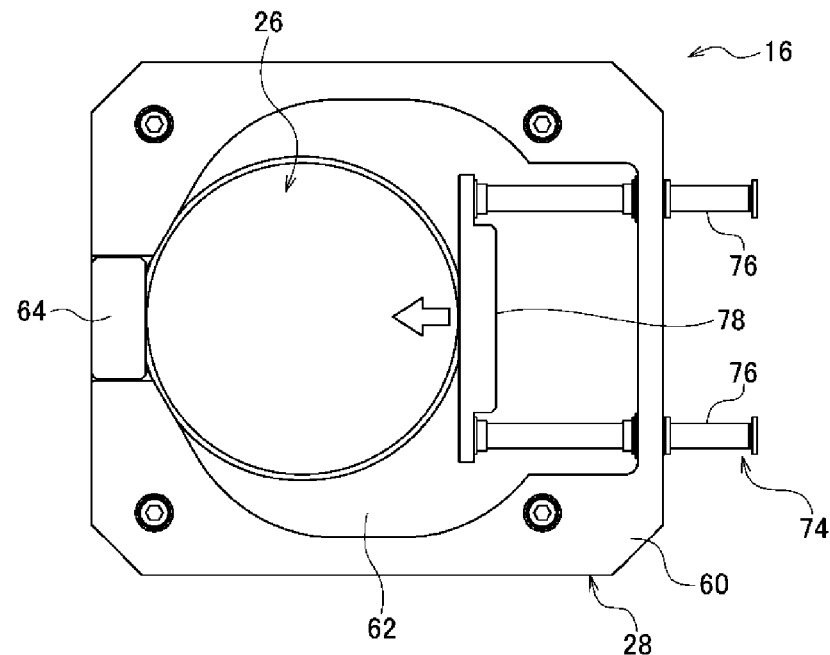
FIG. 10B is a plan view of the positioning apparatus according to embodiment 5.

Embodiment 5 shares common features with embodiment 1 except that a biasing part is provided. The following description of this embodiment highlights features different from those of embodiment 1, and the description of the common features will be simplified or omitted. FIGS. 10A and 10B are plan views of the positioning apparatus 16 according to embodiment 5. FIG. 10A shows a state in which the carried object 1 (not shown) is mounted on the upper unit 26, and FIG. 10 B shows a state in which the carried object 1 is not mounted on the upper unit 26.

The positioning apparatus 16 includes the upper unit 26 that includes the spherical body 46, the retainer part 48 and the upper plate part 50, the lower unit 28 that includes the lower plate part 58 and the guide part 60, and the tilting structure 44 that tilts the region of movement 62 relative to the horizontal plane HP to guide the upper unit 26 toward the reference position. Further, the positioning apparatus 16 includes the base plate 20 that supports the lower unit 28.

The positioning apparatus 16 of this embodiment includes a biasing part 74 that biases the upper unit 26 toward the reference position. The biasing part 74 includes, by way of one example, a pair of spring cylinders 76 and a biasing plate 78 attached to the end of the pair of spring cylinders 76. Each spring cylinder 76 is slidably fixed to a region in the guide part 60 toward the exit frame 24 (the upper side of the tilt). The end of each spring cylinder 76 can advance and recede relative to the region of movement 62, and the built-in coil spring (not shown) biases the end in the direction of advancement toward the region of movement 62. The biasing plate 78 comes into contact with the side surface of the upper unit 26 and biases the upper unit 26 toward the entrance frame 22 (the lower side of the tilt) by a biasing force of the spring cylinder 76.

When the carried object 1 is mounted on the positioning apparatus 16 and is drawn by the drawing mechanism 30 toward the exit frame 24, the upper unit 26 is displaced toward the exit frame 24 against the biasing force of the spring cylinder 6 (FIG. 10A). When the carried object 1 is removed from the positioning apparatus 16, the upper unit 16 is pressed by the biasing plate 78 toward the reference position (FIG. 10B). This ensures that the upper unit 26 is guided toward the reference position more properly.

Embodiments of the present disclosure have been described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

The invention claimed is:

1. A positioning apparatus comprising:
an upper unit that includes a spherical body, a retainer part that retains the spherical body, and an upper plate part provided on the retainer part and adapted to carry a carried object;
a lower unit that includes a lower plate part on which the upper unit is mounted and a guide part that marks a region of movement of the upper unit on the lower plate part; and
a tilting structure that tilts the region of movement relative to a horizontal plane and guides the upper unit, on which the carried object is not mounted, toward a reference position located on a lower side of a tilt,
wherein the guide part has a frame shape, extends on a peripheral edge of an upper surface of the lower plate part, and surrounds an outer perimeter of the region of movement in the lower plate part,
wherein the upper unit moves within the region of movement as the spherical body rolls on the upper surface of the lower plate part, and
wherein the upper unit is prevented from moving outside the region of moving by coming into contact with the guide part.

2. The positioning apparatus according to claim 1, further comprising a base plate that supports the lower unit, wherein
the base plate includes a leg part that projects from a lower surface, and
the tilting structure is formed by the leg part of the base plate.

3. The positioning apparatus according to claim 1, further comprising a base plate that supports the lower unit, wherein
the base plate includes a graded change part in which a thickness of a part that overlaps the region of movement in a vertical direction is progressively smaller from one end of the region of movement toward the other, and
the tilting structure is formed by the graded change part of the base plate.

4. The positioning apparatus according to claim 1, wherein
the lower unit includes a leg part that projects downward, and
the tilting structure is formed by the leg part of the lower unit.

5. The positioning apparatus according to claim 1, wherein
the lower plate part includes a graded change part in which a thickness of a part that includes the region of movement is progressively smaller from one end of the region of movement toward the other, and
the tilting structure is formed by the graded change part of the lower plate part.

6. The positioning apparatus according to claim 1, wherein
the positioning apparatus includes a first attraction member and a second attraction member that attract each other by a magnetic force,
the first attraction member is provided in a region in the lower unit on a lower side of the tilt, and
the second attraction member is provided in a region in the upper unit on a lower side of the tilt.

7. The positioning apparatus according to claim 1, further comprising a biasing part that biases the upper unit toward the reference position.

* * * * *